INVENTOR.
PHILIP C. SHERBURNE
BY
David D. McKenney
ATTORNEY

INVENTOR.
PHILIP C. SHERBURNE
BY
David D. McKenney
ATTORNEY

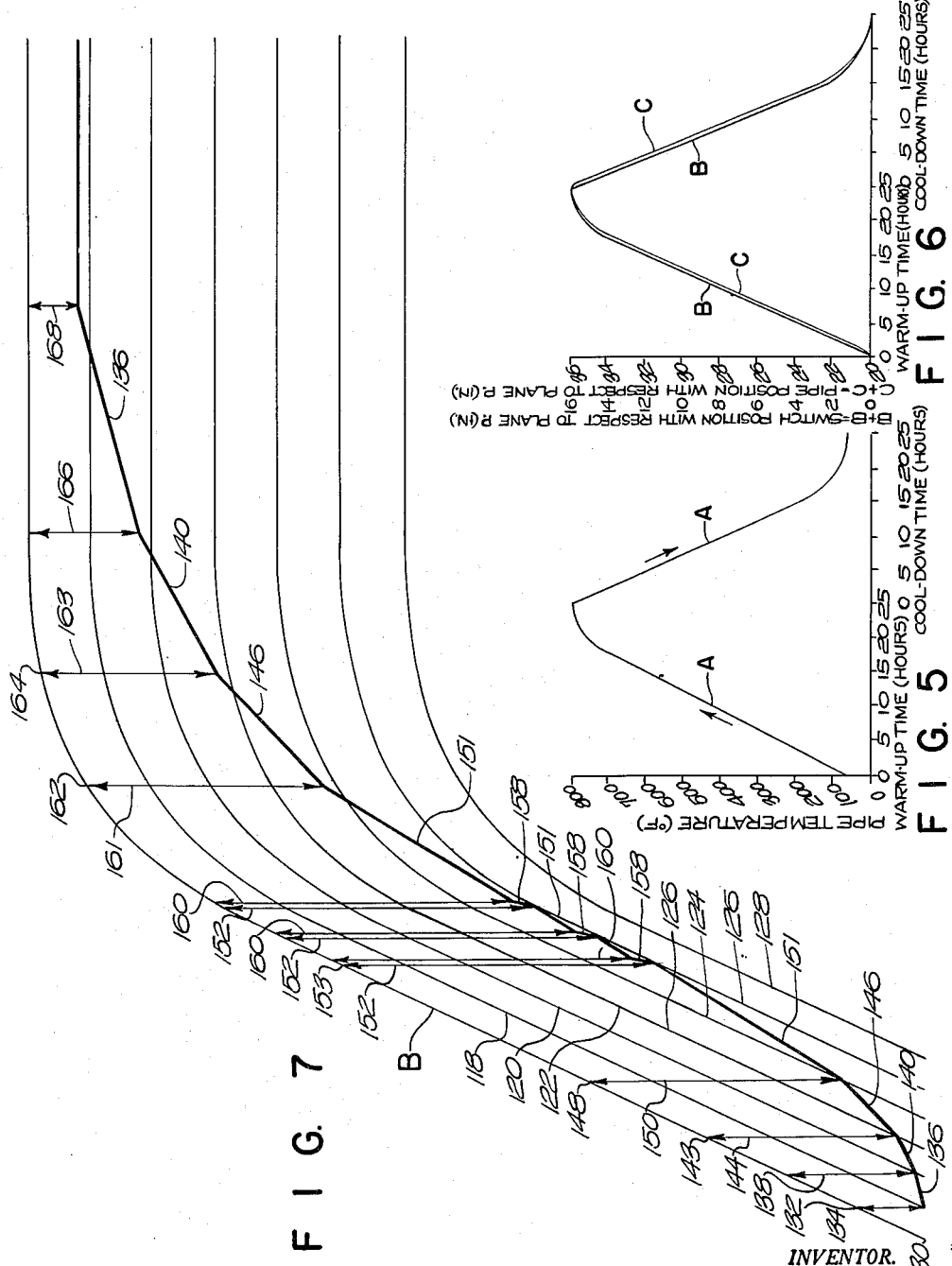

INVENTOR.
PHILIP C. SHERBURNE
BY
ATTORNEY 3,031,160
MOTOR-DRIVEN POSITIONER
Philip C. Sherburne, Rumford, R.I., assignor to Grinnell Corporation, Providence, R.I., a corporation of Delaware
Filed Mar. 23, 1960, Ser. No. 17,141
19 Claims. (Cl. 248—58)

This invention relates to improvements in motor-driven devices for changing the position of fluid handling system equipment with respect to fixed structure in accordance with changes in the temperature of the system.

It frequently happens that fluid handling systems including pipes, valves and fluid vessels are subject to changes in temperature which cause them to expand or contract. The result is that during such temperature changes certain portions of the system attempt to move with respect to pieces of equipment to which the system is connected, and since these attempted movements are never exactly the same as the corresponding thermal movements of such pieces the result is that substantial stresses are produced at certain critical points in the system (usually the end connections to such pieces) with changes in temperature. It has been discovered, however, that by positively moving selected sections of the system in a predetermined manner during the changes in temperature the stresses at the critical points can be kept at safe levels. Accordingly, it has been proposed to move pipe system sections by motor-driven positioning devices controlled by switches which are responsive directly to changes in system temperature, to changes in system orientation caused by temperature changes or to changes in system load caused by system temperature changes, as the case may be.

More particularly, in one proposed embodiment responsive directly to changes in system temperature a motor-driven jack mechanism is connected between fixed building structure and a section of the piping system so as to exert a force on this section in a predetermined direction. A thermostatic motor switch is provided having a first element which is moved in said direction along a path in accordance with changes in the temperature of the system and a second element which is located in this path and which is moved therealong by a movable portion of the jack mechanism. The circuits are arranged so that movement of the first switch element into engagement with the second turns on the motor to drive the jack mechanism in that direction which moves the second switch element out of engagement with the first switch element to turn off the motor. The rate of movement of the jack mechanism, and hence of the second switch element, always exceeds the rate of movement of the first switch element, so that turning on the motor results in the motor being turned off again in a relatively short time.

The proposal above described is essentially an intermittently operating follow-up device in which the jack mechanism causes the pipe to follow in steps the steadily moving temperature responsive first switch element.

Several difficulties arise in such prior proposed devices from this intermittent motor operation. For example, electric motors are frequently employed to drive the jack mechanism, and it is a characteristic of such motors that in starting they draw substantially more current than when they are in continuous operation, with the result that to minimize overheating in this frequent starting type of application it is necessary to provide an electric motor which is substantially larger and therefore more expensive, than one required merely to continuously drive the jack mechanism.

Another difficulty is that because the motors in such intermittently operating devices are normally and properly off for certain periods it is not possible during these periods to determine by an instantaneous visual inspection of the device whether normal operation or an equipment failure is responsible for the off condition, and it is necessary to provide overriding testing circuits to check operability. Ability to determine operability instantaneously is important in view of the fact that when the motor is turned off the device constitutes a rigid connection between the building structure and the system, and large stresses will develop very quickly at the critical piping system points if the motor is not turned on again when it should be.

The present invention overcomes these difficulties by providing for a positioning device of the kind described a variable speed motor which is on substantially constantly during temperature changes. More particularly in the preferred form of this invention, when the first and second switch elements close to turn on the motor the motor runs at its first and lowest speed. If this first speed is not sufficient to cause the second switch element on the jack mechanism to keep pace with or move faster than the first switch element a third switch element is engaged by the first switch element and this engagement alters the motor circuit to increase the motor speed to a second higher speed. If this second speed is not enough to cause the third switch element on the jack mechanism to keep pace with or move faster than the first switch element a fourth switch element is engaged by the first switch element, and so on until a speed is reached at which the jack mechanism does keep pace or move faster than the moving first switch element. As soon as the jack mechanism moves faster than the first switch element the switch element which is then engaged thereby (for example, the fifth switch element) moves out of engagement with this first switch element and the next switch element (fourth) again comes into contact with the first switch element. This causes the motor and hence the jack mechanism to move at the next slower speed, but if in the meantime the first switch element has slowed down to the point where it is still less than the fourth switch element speed then the fourth switch element will move out of engagement with, and the next switch element (third) will come into engagement with, the first switch element, still further slowing the motor. As indicated above the rate of movement of this first switch element is usually not constant, but as its rate changes the motor speed is adjusted accordingly in the manner above described. This operation continues until the rate of movement of the first switch element is less than the lowest rate of speed of the jack mechanism. After this the motor turns off.

By such an arrangement it is possible to provide an electric motor of minimum size. Also by such an arrangement during by far the greater part of the range of movement of the first switch element the motor is operating continuously so that testing systems are not required to determine the operability of the device. When the motor does turn off because the rate of movement of the first switch element is less than the slowest motor speed uncertainty as to the operability of the device after the motor is off is not serious because at this point in the temperature cycle the required movements are slow and if there is a failure there is much more time to detect and repair it before dangerous stresses develop. The accompanying drawings show and the following specification describes preferred embodiments of the present invention.

In the drawings:

FIGURE 5 is a graph plotting the temperature of the pipe in FIG. 1 against time;

FIGURE 6 is a graph like FIG. 5 but plotting the positions of a switch element and the pipe in FIG. 1 against time;

FIGURE 7 is an enlarged view of portions of the graph of FIG. 6 with some distortion for better understanding of the operation.

Figure 1:
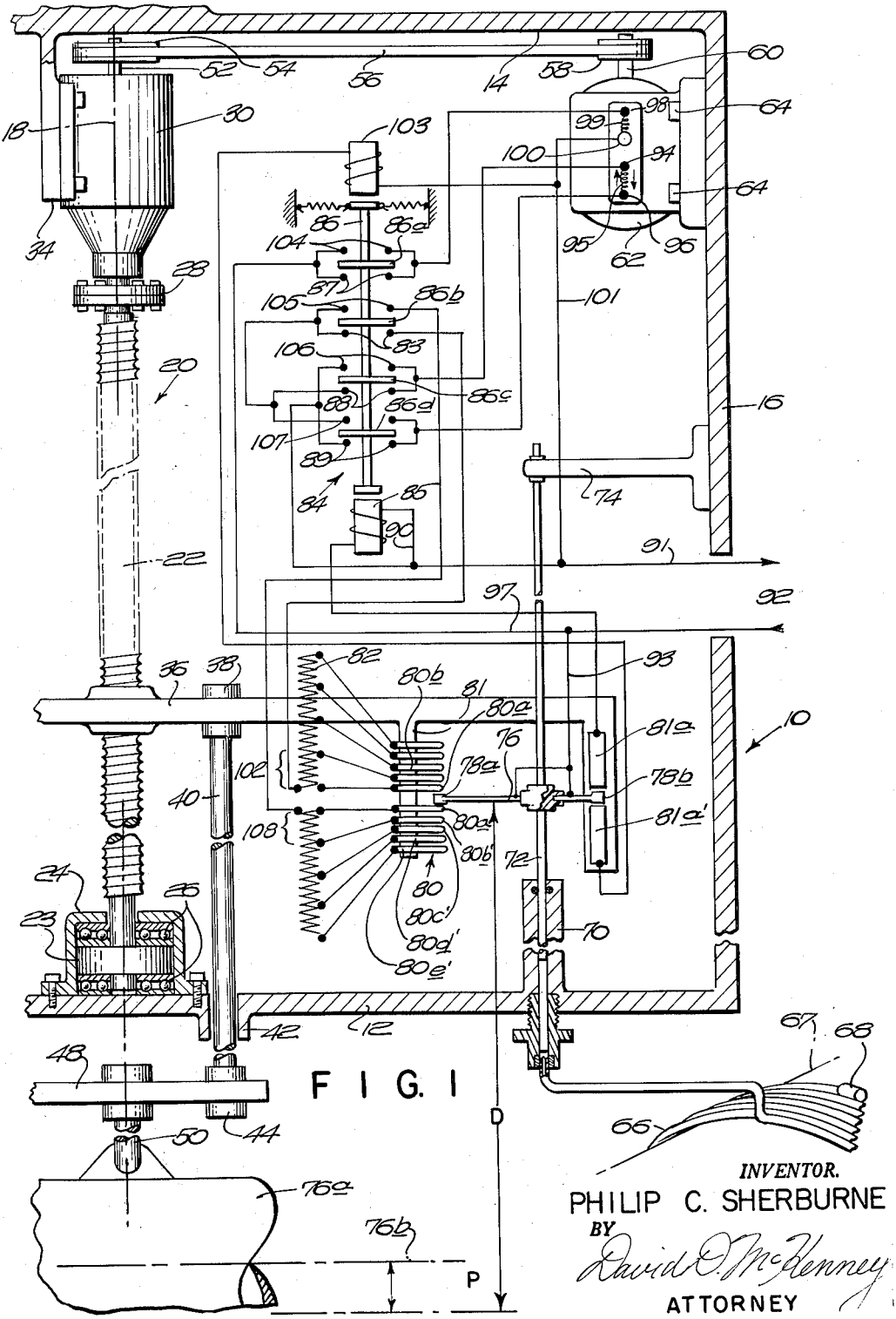
FIGURE 1 is a diagrammatic side elevation view partly in cross section showing one embodiment of a variable speed positioning device in accordance with the present invention employing an electric motor controlled by a temperature switch.

Referring now more particularly to FIG. 1 the motor driven positioning device therein shown comprises a frame 10 having a base plate 12, top plate 14 and side plates 16. This frame is secured in some convenient fashion to building structure (not shown), for example by a pivotal connection on the top plate 14 along the vertical axis 18 of a mechanical jack 20 carried by the frame. This jack comprises a screw member 22 disposed with its own axis coincidental with the axis 18 and with a flange 23 on its lower end rotatably mounted on the base plate 12 by means of mounting unit 24 containing thrust bearings 26 on either side of this flange. The upper end of the screw member 22 is connected through a coupling 28 to a speed reducing unit 30 mounted on the frame by a bracket 34. Between its ends the screw member has a threaded portion as shown on which there is engaged a nut member 36 having connected thereto the upper ends 38 of rods 40 which extend parallel to the screw member and through openings 42 in the base plate 12. The lower ends 44 of these rods are in turn connected to a cross bar 48 the center of which is provided with a single force transmitting rod 50 adapted to be connected to the fluid handling equipment on which the positioning device exerts force.

The speed reducing unit 30 has an input shaft 52 provided with a pulley 54 driven by a belt 56 which is in turn driven by a pulley 58 secured to the output shaft 60 of a reversible shunt wound direct current electric motor 62 mounted on frame side plates 16 by bolts 64.

From the apparatus thus far described it will be apparent that turning on the electric motor 62 rotates the screw 22 of the jack and causes the nut member 36 to move up or down on the screw member depending on the direction of the motor rotation. This results in exertion of force on the fluid handling equipment in one direction or the other along axis 18.

The magnitude and direction of this force is determined in advance by a control switch mechanism which in FIG. 1 comprises a coil of oil-filled tubing 66 wrapped around a pipe 67 which is in the system and changes in temperature during operation. These temperature changes in turn produce changes in the temperature of the oil in the tubing. One end 68 of the coil is closed off and the other end is led to a cylinder 70 mounted on the frame base plate 12 with its axis extending parallel to the screw member 22. This cylinder 70 is open at its upper end and receives the lower end of a piston assembly 72 the upper end of which is guided on the frame by a bearing 74. The piston 72 fits nicely in the cylinder 70 and the volume of this cylinder is small relative to the total volume of oil in the tubing 66 so that changes in the temperature of the oil caused by changes in the temperature of the pipe produce substantial movement of the piston 72 within the cylinder.

Between the cylinder 70 and the bearing 74 a switch element 76 is secured to the piston assembly 72 and has a pair of switch blades 78a and 78b carried on its ends. Opposite the switch blade 78a there are a number of switch blades 80 in a bank secured to an extension 81 of the nut member 36. More particularly these blades 80 form two groups of five, one in line above the blade 78a and the other in line below the blade 78a. Thus these switch blades 80 are so arranged that if the piston assembly 72 moves upwardly from the position shown the switch blade 78a first engages blade 80a, then blade 80b, and so on, the blade 78a being wide enough to make contact with 80b before it leaves contact with 80a. Conversely if the piston assembly 72 moves downwardly from the position shown the switch blade 78a first engages blade 80a', then 80b', and so on.

Switch blade 78b also carried on switch element 76 comes in contact with a switch blade 81a when blade 78a contacts blade 80a. However, blade 81a is continuous in that blade 78b remains in contact with it as long as blade 78a is in contact with any of the blades 80 in the upper bank.

Similarly blade 78b is in contact with another switch blade 81a' as long as blade 78a is in contact with any of the blades 80 in the lower bank.

The switch blade 80a is connected to one end of a resistor 82 which is also connected to a lower contact 83 of a four bank switch 84. Switch blade 81a is connected to the windings of a lower solenoid 85 which, when energized, pulls the armature 86 of switch 84 to its lower position and brings each of the cross bars 86a, 86b, 86c and 86d into engagement with their lower contacts 87, 83, 88 and 89. A conductor 90 connects the windings of solenoid 85 to the return side 91 of a D.C. supply 92. A conductor 93 leads D.C. energy to the switch blades 78a and 78b.

With the above description the operation of the circuit may be explained. Thus if an increase in the temperature of the pipe expands the oil in the tubing 66 sufficiently to move the switch blades 78a and 78b into engagement with the switch blades 80a and 81a, respectively, a circuit is completed as follows: source 92 to conductor 93 to switch blade 78b to switch blade 81a to the windings of solenoid 85 to conductor 90 to conductor 91 back to source 92. This energizes solenoid 85 to move armature 86 of switch 84 downwardly which in turn completes the following circuit: source 92 to conductor 93 to switch blade 78a to switch blade 80a to resistor 82 to one contact 83 to cross bar 86b to the other contact 83 to one contact 88 to cross bar 86c to the other contact 88 to one end 94 of the field windings 95 of the electric motor to the other end 96 of these field windings to one contact 89 to cross bar 86d to the other contact 89 to conductor 91 to the return side of the source 92. This circuit causes current to flow in one direction in the field windings 95.

At the same time the movement of armature 86 to its down position completes still another circuit as follows: source 92 to a conductor 97 to one contact 87 to cross bar 86a to the other contact 87 to one end 98 of the armature windings 99 of the motor to the other end 100 of these windings to a conductor 101 to conductor 91 to the return side of the source 92.

The result of the above completed circuits is that the motor is turned on in that direction which moves the nut member 36 upwardly. However it will be noted that with the switch blade 78a in contact with the switch blade 80a none of the resistance of the resistor 82 is in the field winding circuit. The consequence of this is that the shunt wound motor operates at its lowest speed. If the temperature of the pipe is increasing at such a rate that the piston assembly 72 moves upwardly faster than the upward movement of the nut member 36 at this lowest speed, the switch blade 78a will move beyond the switch blade 80a and come into contact with the next blade 80b. This introduces into the field winding circuit above-described part of the resistance (designated 102) of the resistor 82 with the result that the motor speeds up. The armature circuit is undisturbed.

If this second, faster speed of the motor is sufficient to cause the nut member 36 to keep pace with the upward moving switch blade 78a, the field winding circuit does not change until the rate of movement of the switch blade 78a changes. If, on the other hand, this second higher motor speed is still not enough to keep up with the expansion of the oil in the tubing 66, the switch blade 78a moves on to switch blade 80c which, in the manner above-described, results in still more resistance in series with the windings of the motor and a still greater motor speed. Eventually a motor speed is reached which just about equals or exceeds the rate of movement of the piston assembly 72.

If one motor speed is not sufficient to keep the nut member up with the switch blade 78a but the next motor speed exceeds the switch blade speed, or if after the motor has reached the speed which keeps pace with the moving switch blade 78a the rate of movement of this blade decreases, movement of the nut member will cause the switch blade 78a to be recontacted by that switch blade 80 which will slow down the motor.

The second group of switch blades 80 carried on the nut member is employed to produce the proper movement of this nut member when the pipe is cooling down. Thus for example as the oil in the tubing 66 contracts the switch blade 78b moves downwardly and engages switch blade 81a'. This completes the following circuit: source 92 to conductor 93 to switch blade 78b to switch blade 81a' (corresponding to 81a) to the windings of a solenoid 103 to conductor 101 to conductor 91 to the return side of the source. As a result of this completed circuit solenoid 103 is energized and armature 86 of the switch 84 is moved from the neutral position shown into an upper position in which the cross bars 86a, 86b, 86c and 86d engage contacts 104, 105, 106, and 107, respectively.

This movement of the armature 86 completes the following circuit: source 92 to conductor 93 to switch blade 78a to switch blade 80a' to one contact 105 to cross bar 86b to the other contact 105 to one contact 107 to cross bar 86d to the other contact 107 to the end 96 of the motor field windings 95 through these windings to the other end 94 thereof to one contact 106 to cross bar 86c to the other contact 106 to conductor 91 to the return side of the source.

At the same time a circuit is completed to the motor armature 99 which is the same as the motor armature circuit previously described except that contacts 104 are employed rather than contacts 87.

With these circuits for the field windings and armature completed the motor is turned on, but this time because of the reversal of the direction of current flow in the field windings 95 the motor runs in that direction which causes the nut member 36 to move downwardly. Again, as in the case of the upper bank of switch blades 80, if the switch blade 78a moves on to engage switch 80b' resistance (designated 108) is added to the field windings circuit which increases the speed of the motor. The other blades 80c', 80d' and 80e' add progressively more resistance to produce more speed.

FIGURES 5, 6 and 7 illustrate graphically the operation of the device of FIG. 1 above described. More particularly the graph in FIG. 5 plots on the ordinate the temperature of the pipe and on the abscissa the expiration of time during the warm-up and cool-down periods. Curve A shows that during the warm-up the temperature of the pipe rises rapidly at first and then slopes more gradually as the operating temperature of the pipe is approached. At this operating temperature curve A levels off. Curve A' shows that during the cool-down the temperature of the pipe falls rapidly at first and then slopes more gradually as room temperature is approached. Thus curves A and A' are very similar in shape, and both have the characteristic that their slopes change. In FIG. 5 the cool-down period is shown to begin immediately after the operating temperature is reached. In practice of course the system may be held at the operating temperature for many months before a shut-down (cooldown) for repairs.

It frequently happens that the desired vertical position of a section of the pipe also changes at a varying rate to produce curves like curves A and A' in FIG. 5. Thus, for example, curves B and B' in FIG. 6 are plots of the desired position of the pipe section 76a being positioned in FIG. 1 with respect to a horizontal plane P against time, or in other words curves B and B' are plots of the vertical position of switch blade 78a (FIG. 1) above plane P against time. Curves C and C' are plots of the actual position of the pipe section 76a with respect to plane P as a result of the apparatus of the present invention. Because the center line 76b of the pipe section 76a to which the positioner is connected is at a different level than the switch blade 78a the plane P was chosen to be the level of the pipe section center line when the pipe is at room temperature. As indicated in FIG. 6 when the pipe is at room temperature the switch blade 78a is a distance D above the center line 76b and the plane P. This distance D is 20 inches as indicated on FIG. 6.

Because the switch differentials can be made very small in practice (the distances between switch blades 80 are shown large in the drawings for easier understanding), for example of the order of a few thousandths of an inch, curves B and C and B' and C' are very close together in the scale of FIG. 6. Accordingly, FIG. 7 is an enlarged view of curves B and C, distorted somewhat for better understanding of the principles of operation.

Thus in FIG. 7 the curve B represents the path of movement of the switch blade 78a with changes in the system temperature. Because of the necessity for a switch differential it is impossible to have the path of movement of the pipe exactly follow the path of movement of the switch blade 78a. Hence the additional lines 118, 120, 122, 124, 126 and 128 represent the switch differentials which separate the switch blades 80. This will be more apparent in view of the following description of operation with reference to the graph of FIG. 7. The switch blade 78a begins to rise with temperature increases from a cold position 130 until it reaches point 132. At this point the switch blade 78a has moved upwardly far enough to contact switch blade 80a the distance of this movement being shown on FIG. 7 as the distance 134. This turns on the motor at its slowest speed which provides an upwardly sloping path 136. In other words the nut member moves upwardly with changes in temperature along the curve 136, whereas the switch blade 78a moves upwardly from point 132 with changes in temperature along the curve B. Because the latter line has a much steeper slope than the former a differential 138 is soon established between the switch blade 78a and the nut member or in other words the switch blade 78a engages switch blade 80b. This produces a higher rate of motor speed indicated by the curve 140. However, the new nut member speed of upward movement represented by curve 140 is still much less than the upward speed of movement of the switch blade 78a and in a short time the switch blade 78a has reached a point 143 on the curve B at which point the differential 144 exists between the switch blade 78a and the nut member or in other words the switch blade 78a engages switch blade 80c.

This latter engagement again increases the speed of the motor, as indicated by the line 146, but again this line does not rise as steeply as B, and when switch blade 78a has reached a point 148 on curve B the switch blade 78a has engaged the switch 80d indicating a differential between the switch blade 78a and nut member equal to the distance 150. This time the speed of the motor (curve 151) nearly approximates the rate of movement of the switch blade 78a, but not quite, and once more the differential between the switch blade 78a and the nut member increases to an amount 152 at which time the switch blade 78a is located at point 153 on the curve B. In other words switch blade 78a engages switch blade 80e, but this time the speed of the motor exceeds the speed of the switch blade 78a as indicated by the fact that the curve 158 rises more steeply than the curve B. For the first time the differential between the switch blades 78a and the nut member is decreased and when it reaches the value represented by differential 160 the switch blade 78a disengages switch blade 80e and recontacts switch blade 80d. This slows down the motor to the speed 151 which was somewhat less than the rate of speed of the switch blade 78a so that in a short time the switch blade 78a disengages switch blade 80d and recontacts the switch blade 80e, and this operation is repeated.

As long as the rate of movement of the switch blade 78a remains substantially constant as shown by the lower portion of curve B of FIG. 7 motion of switch 78a back and forth between blades 80e and 80d will continue. As a practical matter the first portion of curve B is probably not exactly a straight line.

In the next portion of the curve B in FIG. 7 the rate of increase in temperature of the piping system decreases, and hence the rate of upward movement of the switch blade 78a decreases. The effect of this is that whereas the motor speed which provided the nut member movement indicated by 151 was less than the rate of movement of the switch blade 78a in the lower portion of curve B, now this rate of movement 151 is greater than the rate of movement of the switch blade 78a, and the differential between the curves B and 151 decreases to a value 161 when the switch blade 78a reaches a point 162. At this differential 161 the switch blade 78a contacts switch blade 80c, and the rate of movement of the nut member is reduced to 146. However even this is greater than the then rate of movement represented by the curve B and the differential further decreases to a value 163 when the switch blade reaches position 164. The switch blade 78a reengages switch blade 80b and the speed of the motor decreases to that represented by 140. At this point the curve B is nearly horizontal so that the differential further decreases to a value 166 at which point the switch blade 78a engages switch blade 80a providing the speed 136. This in turn exceeds the now stationary switch blade 78a and the differential still further decreases to value 168 turning off the motor completely.

FIG. 6 shows the curve which is followed during the cooling down cycle of the piping system, and because of similarity between this curve and that of the heating up cycle the cooling down operation is similar to that above described. During the cooling down period switch blade 78a works in conjunction with the switch blades 80a' through 80e' shown in FIG. 1.

In the above description of operation is has been assumed that the switch blade 78a disengages each of the switch blades 80 at the same time that it contacts the next switch blade, so that there is no time when the switch blade 78a is touching two of the switch blades 80. The purpose of this assumption is merely to simplify FIG. 7, because as a practical matter and as shown in FIG. 1 switch blade 78a would contact the next blade 80 before it disengaged from the previous one. However, while both such blades 80 are engaged an intermediate motor speed would result which if shown on FIG. 7 would make understanding of the operation more difficult. The principles of operation in the two cases are the same. In fact it would be within the scope of the invention to have switch blade 78a bridge at least two of the blades 80 at all times.

Some mention should be made of the small decrease in differential required to change to a lower motor speed. For example it takes an increase in differential from value 150 to value 152 to go from the beginning of motor speed 151 to the beginning of motor speed 158, whereas it takes only a decrease in differential from value 152 to value 160 to return to motor speed 151 from motor speed 158. The reason for this is that to go from the beginning of motor speed 151 to the beginning of motor speed 158 switch blade 78a must contact and travel across the width of blade 80d, whereas to return to motor speed 151 from motor speed 158 switch blade 78a need only travel back enough to disengage from the same side it engaged. The above refers to travel of the switch blade 78a. Actually this is relative motion because both switch blade 78a and the blades 80 are moving.

In practice the largest differential 152 may be very small being of the order of ten or fifteen thousandths of an inch so that the lag of the movement of the nut member (and hence of the pipe) behind the movement of the switch blade 78a may be very small.

Figure 2:
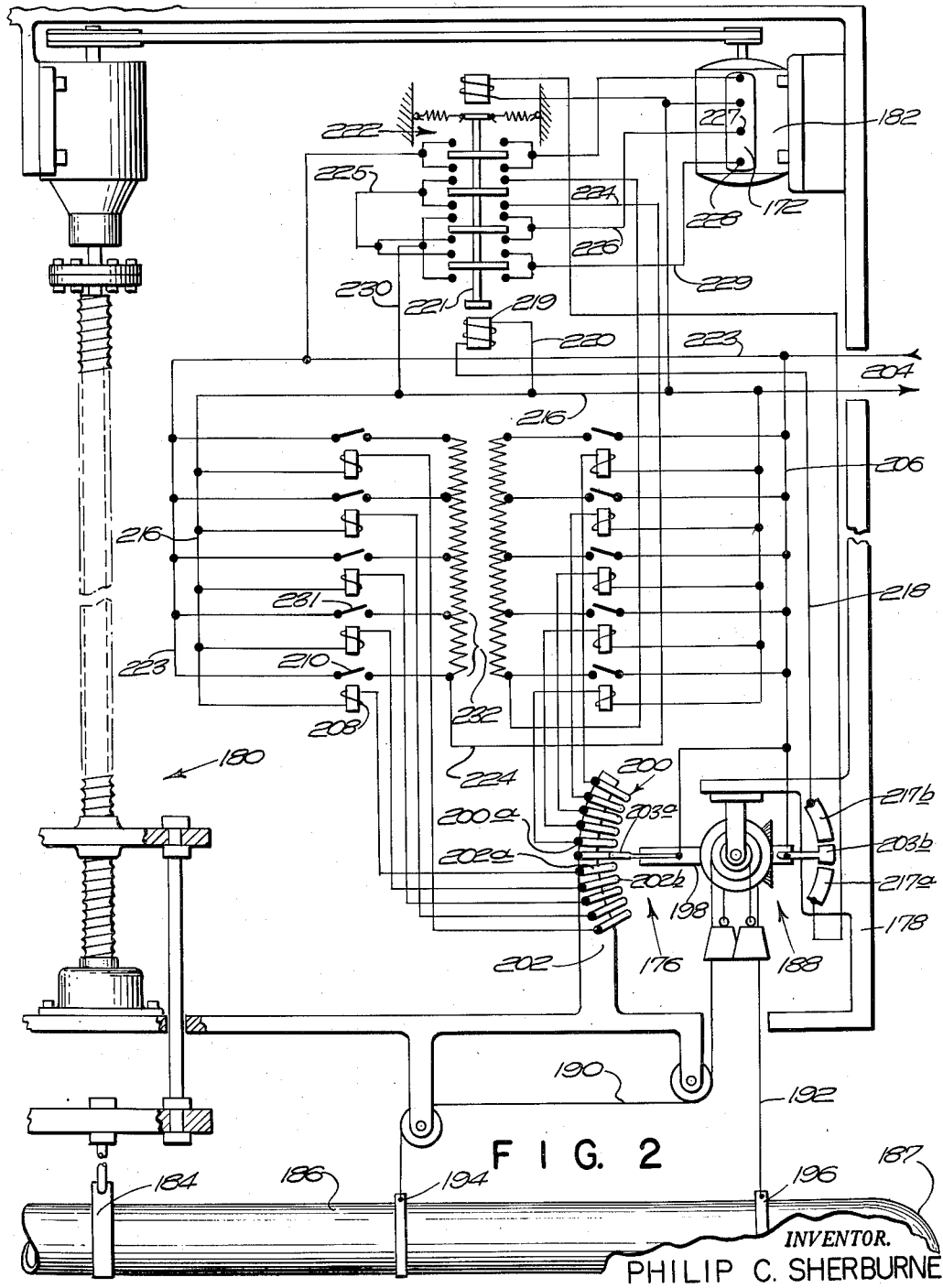
FIGURE 2 is a view like FIG. 1 but showing a different circuit arrangement and showing the motor controlled by a system orientation switch.

Referring now to FIG. 2, this shows diagrammatically another arrangement of a motor-driven positioning device in accordance with the present invention. In this arrangement the relatively large electric currents for the electric motor field windings 172 do not pass through the switch 176 which is actuated by a changing condition of the piping system and which it may be desirable to make quite delicate so that the differentials between the various switch positions can be as small as possible. Instead this switch merely actuates solenoid relays in circuits which actually carry the motor field winding currents.

More particularly the positioner of FIG. 2 comprises a frame 178 with a jack mechanism 180 and motor 182 arranged in a manner similar to that shown in FIG. 1. In this case the positioner is shown connected at 184 to a horizontally disposed pipe section 186 which is to be positioned in accordance with temperature changes. In this case it is assumed to have been determined in advance of the installation that because of the particular configuration of the piping system the desired positioning of the section 186 is achieved by maintaining this section horizontal at all times. For example, one end of the section 186 may be connected to a vertical riser 187 which expands with changes in temperature and moves that end vertically. The function of the positioner is to lift the point 184 in step with this vertical movement at the riser. This result may be accomplished by a differential mechanism 188 having cables 190 and 192 connected to spaced apart points 194 and 196 respectively on the horizontal pipe section 186. The armature 198 of the differential mechanism rotates clockwise from the position shown when the point 194 rises above the point 196 or the point 196 falls below the point 194, and conversely this armature rotates counterclockwise from the position shown when the point 196 rises above the lever of the point 194 or the point 194 falls below the point 196. Switch blade groups 200 and 202 similar to the switch blades 80 in FIG. 1 are engaged by a switch blade 203a on the armature 198 when the latter rotates from its neutral position shown.

Assume that expansion of the vertical riser 187 raises the point 196 sufficiently above the level of the point 194 to cause the switch blade 203a (rotating counterclockwise) to engage the first switch blade 202a of the group 202. This completes the following circuit: a power supply 204, a conductor 206, the switch blade 203a, the switch blade 202a, the windings 208 of a relay switch 210, and a conductor 216 back to the power supply. At the same time that switch blade 203a engages switch blade 202a another switch blade 203b engages a switch blade 217b and completes the following circuit: power supply 204, conductor 206, switch blade 203b, a switch blade 217b, a conductor 218, the windings of a solenoid 219, a conductor 220 and conductor 216 back to the supply. This last-mentioned circuit moves the armature 221 of a relay 222 from its neutral position shown to its down position in which each of the four cross bars engage their lower contacts.

Accordingly, closing of the switch 210 completes a third circuit as follows: power supply 204, a conductor 223, switch 210, a conductor 224, switch 222, a conductor 225, switch 222, a conductor 226 to one end 227 of the motor field windings 172, through these windings to the other end 228, a conductor 229, switch 222, a conductor 230 and conductor 216 back to the power supply. This circuit turns on the motor in that direction which moves the nut member of the jack upwardly to lift the pipe section at connection 184. This movement lifts point 194 upwardly in an effort to maintain it on the same level as the upwardly moving point 196. However, if point 196 is moving upwardly faster than the jack is lifting point 194 switch blade 203a will leave switch blade 202a and move into engagement with the next blade 202b. The effect of this is to complete a circuit closing another switch 231, thereby adding more resistance (232) to the field windings and causing the motor speed to increase. Thus the operation is similar to that described in connection with the circuit of FIG. 1.

In cooling down from operating temperature the point 196 on the horizontal section would move below point 194 and produce clockwise rotation of the armature 198. Switch blade 203a then engages switch blade 200a and simultaneously switch blade 203b engages switch blade 217a. The effect of this is to cause the armature 221 of switch 222 to be moved to its upper position and the circuits completed to the motor cause the motor to run in the opposite direction, that is to move the jack nut member downwardly. As in the case where the nut member was moved upwardly the motor has its speed increased as needed by adding resistance to the field winding circuit so that the point 194 will keep in step with the downwardly moving point 196.

The principal difference between the operation of this circuit and of that shown in FIG. 1 is that the armature 198 and switch blades 200 and 202 are not called upon to carry the motor field winding currents but are employed instead to merely carry currents in the windings of relay switches which close circuits which carry these currents.

Figure 3:
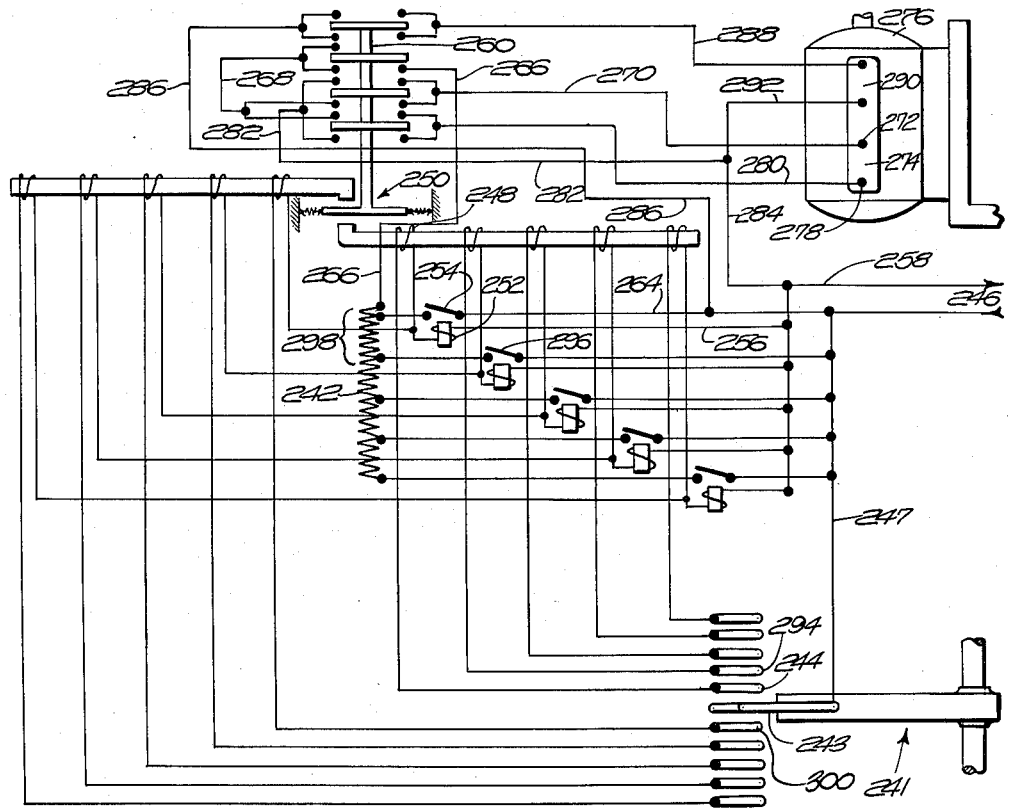
FIGURE 3 is another view like FIG. 1 (with some parts omitted) showing still another circuit arrangement and showing the motor controlled by a switch like the switch in FIG. 1.

Referring now to FIG. 3 this illustrates still another circuit which may be employed to vary the speed of the motor as required. In this FIG. 3 the jack mechanism is not shown and the switch 241 which responds to changing conditions of the pipe may be of the type shown in FIG. 1. In this case the objective is to employ only one resistor 242 for both up and down motor operation. More particularly when the switch blade 243 engages the switch blade 244 a circuit is completed as follows: a supply 246, a conductor 247, the switch blade 243, the switch blade 244, one set of windings 248 of a solenoid relay 250, the windings 252 of a solenoid relay 254 and conductors 256 and 258 back to the supply. This moves the armature 260 of the solenoid relay 250 into its down position in which the four armature cross bars engage the lower sets of contacts and the following circuit is completed: supply 246, a conductor 264, relay switch 254 (now closed), a conductor 266, solenoid relay 250, a conductor 268, solenoid relay 250 again, a conductor 270 to one end 272 of the field windings 274 of the motor 276, through these field windings to the other end 278, a conductor 280, solenoid relay 250 again, a conductor 282, a conductor 284 and conductor 258 back to the supply.

At the same time movement of the armature 260 of the solenoid relay 250 completes another circuit as follows: supply 246, a conductor 286, solenoid relay 250, a conductor 288, the armature 290 of the electric motor 276, a conductor 292, conductor 284, and conductor 258 back to the supply.

With these above circuits completed the motor turns on in that direction which moves the jack upwardly to follow the upwardly moving switch blade 243. The motor operates at its lowest speed because no appreciable portion of the resistance of resistor 242 is in the field winding circuit. If, as a result, switch blade 243 moves on and engages the next switch blade 294 the operation is the same as above described except that relay switch 296 is closed and a portion 298 of the resistor 242 is added to the motor field windings, speeding up the motor.

If, instead of moving upwardly (relative to the jack) the switch blade 243 moves downwardly and engages switch blade 300 the same circuits are established except that the armature 260 of the solenoid relay is moved to its upper position. The effect of this is to reverse the direction of current flow in the motor field windings 274. Otherwise the same resistor 242 and the same relay switches 254, 296 etc. are employed. Reversing the current flow in the field windings reverses the direction of the motor.

Figure 4:
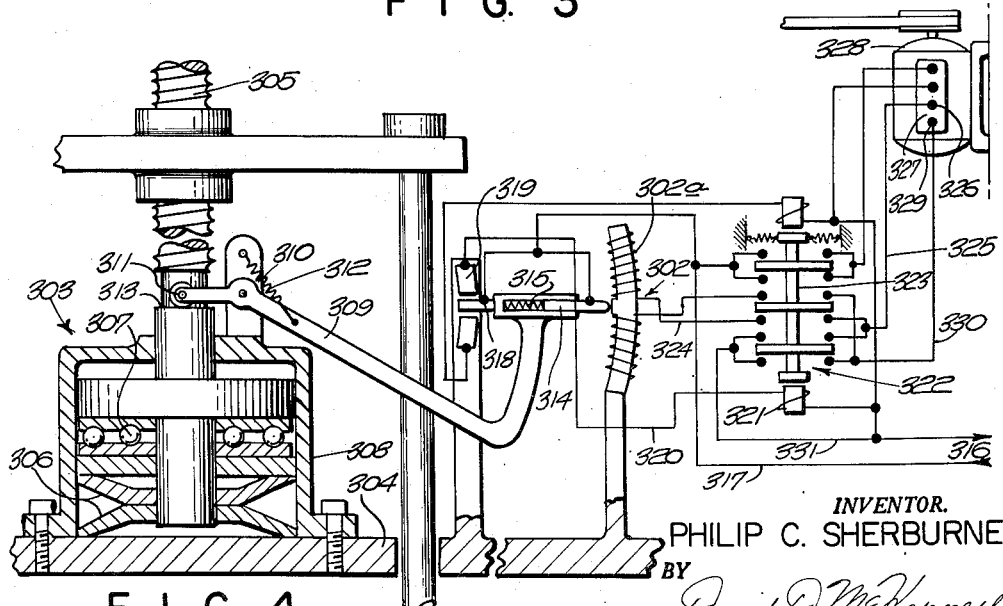
FIGURE 4 is a fragmentary side elevation view, partly in cross section, of another embodiment in which a rheostat is used which is actuated by changes in the load exerted on the positioner.

Referring now to FIG. 4 this illustrates diagrammatically an embodiment of the present invention wherein a sliding contact rheostat 302 is used. In this case the objective of the positioner is to maintain a substantially constant upward force on the equipment to which the positioner is connected in the nature of a constant support hanger. This is accomplished by employing a spring-type load cell 303 interposed between the frame 304 and the rotating screw member 305 of the jack mechanism. More particularly this load cell includes a pair of disc Belleville springs 306 and a roller thrust bearing 307 in a housing 308 with a lever 309 pivoted to the housing at 310 and having one end 311 urged by a spring 312 against a shoulder 313 on the screw member. Variations in the downward force exerted on the jack mechanism by the load will result in changing the deflection of the disc springs and rotation of the lever 309. The other end of the lever is provided with a sliding electrical contact 314 urged by a spring 315 against the surface of the rheostat 302. In the position shown the contact 314 is at a null point on the rheostat and no circuit is completed therethrough to the motor. This is the desired condition, but if due to thermal changes the supported equipment is pulled downwardly away from the positioner and the force exerted on the positioner is increased the disc springs 306 will be further compressed rotating the lever 309 counterclockwise and bringing the contact 314 into circuit-completing engagement with the upper portion 302a of the rheostat. This completes a circuit from a supply 316 to a conductor 317 to a second contact 318 on the lever to a contact 319 on the frame to a conductor 320 to one set of windings 321 of a relay operated switch 322 and back to the supply. Energizing windings 321 moves the armature 323 of switch 322 to a down position which completes the following circuit: supply 316, conductor 317, contact 314, rheostat portion 302a, a conductor 324, switch 322, a conductor 325 to one end 326 of the field windings 327 of a motor 328 which drives the jack, through these windings to the other end 329, a conductor 330, switch 322 again, a conductor 331 and back to the supply. The farther up on the rheostat portion 302a the contact 314 moves the faster the motor turns because of the increase in the resistance introduced into the motor field windings.

Other portions of the switch 322 not involved in the above circuits provide appropriate circuits for the motor armature and for reversal of current in the motor field windings when the lever 309 rotates clockwise (which occurs when the load moves upwardly).

Figure 8:
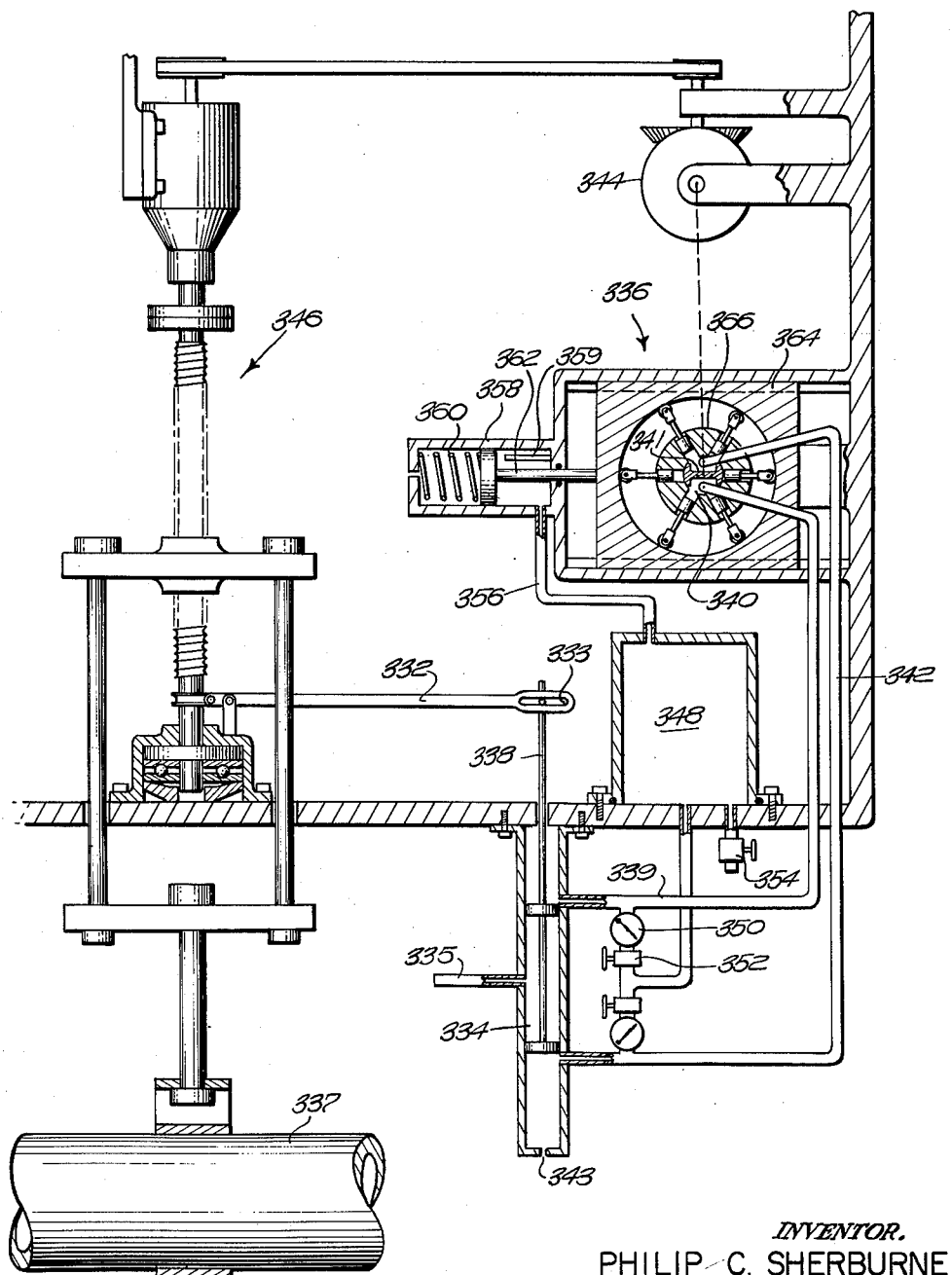
FIGURE 8 is a diagrammatic view of a variable speed motor positioning device employing an air motor to drive the jack mechanism.

Referring now to FIG. 8 this illustrates that a positioner employing a gas motor instead of an electric motor may also have the speed of its jack mechanism varied in accordance with variations in the rate of change of a condition of the piping system. As in the case of FIG. 4 the positioner in FIG. 8 is of that type which seeks to maintain a constant upward supporting force on the piping section to which it is connected so that a lever 332 is employed corresponding to the lever 309 in FIG. 4 and functioning in the same manner. In this case, however, the outer end 333 of the lever 332 operates a valve 334 controlling the flow of air from a supply 335 to a reversible air motor 336 of conventional construction, for example, a rotating piston air motor. Thus if a downward movement of the pipe section 337 takes place the lever 332 rotates in a counterclockwise direction and lifts the stem 338 of the valve 334 establishing communication from the supply to a conduit 339 which is led to a chamber 340 of the air motor. The air motor is exhausted to atmosphere through another chamber conduit 341, a conduit 342 and an opening 343 in the valve 334. Pressure in the chamber 340 tends to rotate the motor clockwise as shown in FIG. 8 and through a gear and belt mechanism 334 drives the jack mechanism 346 of the positioner.

While pressure is being admitted to the conduit 339 by operation of the valve 334 it is also permitted to enter an accumulator tank 348 through a check valve 350 and restriction valve 352. From this accumulator tank pressure is able to escape to atmosphere at all times through a bleed valve 354. The pressure in the accumulator tank 348 is led through a conduit 356 to a piston-cylinder unit 358. The piston in this unit is pressed against a stop 359 when there is no pressure in the accumulator tank 348 by a spring 360. When the piston is against this stop a piston rod 362 holds the air motor race 364 in concentric alignment with the shaft 366 with the result that this shaft does not turn even when pressure is admitted to the chamber 340 as above described. However, inasmuch as pressure enters the accumulator tank 348 and from there the piston cylinder unit 358 at the same time that it passes along the conduit 339 to the air motor chamber 340, the pressure in the unit 358 will build up and compress the spring 360 and move the race 364 in a position eccentric to the shaft. This results in rotation of the motor. The amount of eccentricity depends upon the pressure in the accumulator tank 348 which in turn depends upon the length of time during which the valve 334 opens the conduit 339 to the supply. Accordingly, if the pipe section 337 is moving downwardly quite rapidly and the lever 332 is rotated in a counterclockwise direction a substantial amount, the pressure in the accumulator tank 348 rises to a relatively high value producing substantial eccentricity of the race in the air motor, and the air motor turns at a high rate of speed as required by the rapidly moving pipe section 337.

In this way the speed of the motor is controlled in accordance with the amount of time during which the valve 334 is maintained opened with the result that speed of the motor is properly adjusted to the conditions of pipe movement.

If the lever 332 moves clockwise, as it would for example if the pipe section 337 were to move upwardly toward the positioner, the operation is the reverse of that above described with the valve 334 admitting air pressure from the source to the conduit 342 leading to the chamber 341 in the air motor. In this case the chamber 340 and conduit 339 provide the exhaust for the air motor, and the motor turns in the opposite direction, providing there is eccentricity of the race. The same accumulator tank 348 working together with the same piston-cylinder unit 358 provides this eccentricity which, although it is in the same direction as before, results in opposite rotation of the motor because the air pressure is supplied to the chamber 341 rather than to the chamber 340.

I claim:

1. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed motor, means for transmitting the output of said motor to one of said components to move said last mentioned component to produce linear movement of said second component, said linearly moving second component exerting force on said equipment through said connecting means to change said second condition of said system, and means responsive to a change of said first condition and substantially simultaneously responsive to a change of said second condition for varying the speed of said motor in accordance with variations in the rate of change of said first condition, whereby said predetermined relationship is maintained.

2. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed motor, means for transmitting the output of said motor to one of said components to move said last mentioned component to produce linear movement of said second component, said linearly moving second component exerting force on said equipment through said connecting means to change said second condition of said system, and means responsive to a change of said first condition for varying the speed of said motor in one sense in accordance with variations in the rate of change of said first condition and substantially simultaneously responsive to said change in said second condition for varying the speed of said motor in the opposite sense whereby said predetermined relationship is maintained.

3. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed motor, means for transmitting the output of said motor to one of said components to move said last mentioned component to produce linear movement of said second component, said linearly moving second component exerting force on said equipment through said connecting means to change said second condition of said system, and means responsive to a change of said first condition for starting the operation of, and subsequently varying the speed of said motor in one sense in accordance with variations in the rate of change of said first condition and substantially simultaneously responsive to said change in said second condition for varying the speed of said motor in the opposite sense and subsequently stopping said operation whereby said predetermined relationship is maintained.

4. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed motor, means for transmitting the output of said motor to one of said components to move said last mentioned component to produce linear movement of said second component, said linearly moving second component exerting force on said equipment through said connecting means to change said second condition of said system, means for controlling the operation of said motor, first actuating means responsive to a change of said first condition for actuating said control means in one direction to start the operation of, and subsequently vary the speed of said motor in one sense in accordance with variations in the rate of change of said first condition, and second actuating means responsive to said change in said second condition for actuating said control means in the opposite direction to vary the speed of said motor in the opposite sense and subsequently stop said motor operation, whereby said predetermined relationship is maintained.

5. The device as set forth in claim 4 wherein the means for controlling the operation of the motor comprises an energy valve regulator having first and second members, said first member being movable through a range of positions with respect to said second member, said first member admitting progressively more energy to the motor as said first member moves from one end of said range of positions toward the other.

6. The device as set forth in claim 5 wherein the first actuating means comprises a sensing means connected to said first member and to said system for sensing a change in said first condition and for moving said first member with respect to said second member through said range of positions in one direction in response to said change in said first condition.

7. The device as set forth in claim 6 wherein the second actuating means comprises a motion transmitting means operatively connected to said motor and to at least one of said regulator members for moving said first member with respect to said second member, through said range of positions in the opposite direction in response to said change in said second condition.

8. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed motor, means for transmitting the output of said motor to one of said components to move said last mentioned component to produce linear movement of said second component, said linearly moving second component exerting force on said equipment through said connecting means to change said second condition of said system, means for controlling the operation of said motor, first actuating means responsive to a change of said first condition over a predetermined portion of said range for actuating said control means in one direction to affect operation of said motor at a speed lower than that required to change said second condition to maintain said relationship for the then current change in said first condition and to subsequently increase the speed of said motor in accordance with a change of said first condition to a speed at least as high as that required to change said second condition to maintain said relationship for the then current change in said first condition, and second actuating means responsive to a change in said second condition which takes place at a faster rate than that required to maintain said relationship for actuating said control means in the opposite direction to decrease the speed of said motor from said higher speed to said lower speed and to subsequently stop the operation of said motor, whereby said motor operates continuously as said first condition changes throughout said range of conditions.

9. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed electric motor having an input terminal, an electric circuit having an input terminal, means for transmitting the output of said motor to one of said components to move said last mentioned component to produce linear movement of said second component, said linearly moving second component exerting force on said equipment through said connecting means to change said second condition of said system, electric resistance means in said circuit and connected to said motor input terminal for controlling the operation of said motor and having first and second members, said first member being movable through a range of positions with respect to said second member, said first member varying the amount of electric resistance in the circuit to the motor input terminal as said first member moves from one end of said range of positions toward the other, first actuating means responsive to a change of said first condition for moving said first member in one direction with respect to said second member in accordance with variations in the rate of change of said first condition, and second actuating means responsive to said change in said second condition for moving said first member in the opposite direction with respect to said second member whereby said predetermined relationship is maintained.

10. For a fluid handling system wherein it is desired to maintain a predetermined relationship between a first condition of said system which condition changes at a varying rate over a range of conditions and a second different condition of said system, a motor driven device for changing said second condition comprising a frame, a jack having a first component mounted on said frame and having a second component which is movable linearly with respect to said first component, means connecting said second component to fluid handling equipment of said system, a variable speed electric motor having an input terminal, an electric circuit having an input terminal, means for transmitting the output of said motor to one of said components to move said last mentioned component to produce linear movement of said second component, said linearly moving second component exerting force on said equipment through said connecting means to change said second condition of said system, electric resistance means in said circuit and connected to said motor input terminal for controlling the operation of said motor and having first and second members, said first member being movable through a range of positions with respect to said second member, said first member varying the amount of electric resistance in the circuit to the motor input terminal as said first member moves from one end of said range of positions toward the other, switch means connected to said first member and to said motor to prevent operation of said motor when said first member is at one end of said range of positions, first actuating means responsive to a change of said first condition for moving said first member in one direction with respect to said second member to start the operation of, and subsequently vary the speed of said motor in one sense in accordance with variations in the rate of change of said first condition, and second actuating means responsive to said change in said second condition for moving said first member in the opposite direction with respect to said second member to vary the speed of said motor in the opposite sense and subsequently stop said motor operation, whereby said predetermined relationship is maintained.

11. The device as set forth in claim 10 wherein said electric resistance means comprises an electrical resistor which is in said circuit and which is connected to said motor input terminal, a plurality of input connections on said resistor, each portion of the circuit between one of said resistor input connections and said motor input terminal comprising a different amount of electrical resistance, and said first and second members comprise a selector switch having an armature member electrically connected to said circuit input terminal and having a contact member with a plurality of contacts connected to said resistor input connections, one of said members being mounted on said second component and movable therewith along a path, and the other of said members being movable along substantially the same path, whereby relative movement of said members causes said armature member to engage different contacts on said contact member.

12. The device as set forth in claim 11 wherein said first actuating means comprises a temperature responsive device having an element which is moved by changes in the temperature of said system, and means connecting said first member to said element.

13. The device as set forth in claim 11 wherein a solenoid switch is located between said circuit input terminal and each of said resistor input connections, and in which said selector switch is located between said circuit input terminal and the solenoids of said solenoid switches, whereby operation of said selector switch selectively closes said solenoid switches and electric current for said motor by-passes said selector switch.

14. The device as set forth in claim 10 wherein said electric resistance means comprises an electric resistor which is in said circuit and which is connected to said motor input terminal, a plurality of input connections on said resistor, each portion of the circuit between one of said resistor input connections and said motor input terminal comprising a different amount of electrical resistance, and said first and second members comprise a selector switch having an armature member electrically connected to said circuit input terminal and having a contact member with a plurality of contacts connected to said resistor input connections, one of said members being connected to said frame and fixed therewith, and the other of said members being connected to said fluid handling equipment and movable therewith relative to said one member, whereby relative movement of said members causes said armature member to engage different contracts on said contact member.

15. The device as set forth in claim 14 wherein said other member is connected to said fluid handling equipment through a pair of elements each connected to said member and to a different point on said fluid handling equipment, each element being moved by movement of said equipment at said point thereon to which it is connected, whereby different movements of said points on said equipment move said member to actuate said selector switch.

16. The device as set forth in claim 10 wherein said electric resistance means comprises a rheostat in said circuit having an output terminal connected to said motor input terminal and having an input terminal connected to said circuit input terminal and having a movable contact element for varying the resistance of said rheostat between said rheostat input and output terminals by relative movement therebetween.

17. The device as set forth in claim 16 wherein said rheostat is connected to said frame and fixed therewith, said contact element is connected to said first member, and wherein the first actuating means for moving said first member comprises a load cell which is secured to said frame and to said equipment and having a first cell member which is fixed with respect to said frame, a second movable cell member which is movable with respect to said frame, a deformable material between said members which is deformed by changes in load exerted on said device by said equipment to move said second movable cell member with respect to said frame, whereby changes in said load move said first member.

18. A device as set forth in claim 7 wherein said motor is a variable speed gas motor driven by gas under pressure from a source of gas under pressure supplied to a first chamber of said motor.

19. A device as set forth in claim 18 wherein said gas motor has a shaft and a race around said shaft which is movable through a range of positions in varying amounts of eccentricity with respect to said shaft to vary the motor speed wherein there are means for moving said race comprising a second pressure chamber having a movable wall connected to said race, an inlet to said second pressure, an accumulator tank connected to said second pressure chamber inlet, a bleed on said accumulator tank, a conduit leading gas under pressure to said first motor chamber and an inlet to said accumulator tank from said conduit.

References Cited in the file of this patent
UNITED STATES PATENTS

| | | |
|---|---|---|
| 1,406,255 | Bouton | Feb. 14, 1922 |
| 1,551,400 | Jones | Aug. 25, 1925 |
| 2,248,730 | Wood | July 8, 1941 |
| 2,549,645 | Tendall | Apr. 17, 1951 |
| 2,918,238 | Zollinger | Dec. 22, 1959 |